(12) United States Patent
Nisbet (10) Patent No.: US 7,649,893 B2
(45) Date of Patent: Jan. 19, 2010

(54) GROUP CALLS IN A MOBILE RADIO SYSTEM

(75) Inventor: Rex Allen Nisbet, Christchurch (NZ)

(73) Assignee: Tait Electronics Limited, Christchurch (NZ)

(*) Notice: Subject to any disclaimer, the term of this patent is extended or adjusted under 35 U.S.C. 154(b) by 648 days.

(21) Appl. No.: 10/520,827

(22) PCT Filed: Jul. 4, 2003

(86) PCT No.: PCT/NZ03/00142

§ 371 (c)(1),
(2), (4) Date: Aug. 9, 2005

(87) PCT Pub. No.: WO2004/006611

PCT Pub. Date: Jan. 15, 2004

(65) Prior Publication Data

US 2006/0099982 A1    May 11, 2006

(30) Foreign Application Priority Data

Jul. 4, 2002    (NZ) ...................................... 519996

(51) Int. Cl.
*H04L 12/28* (2006.01)
*H04L 12/56* (2006.01)

(52) U.S. Cl. .................. 370/395.42; 370/260; 370/332; 370/353; 370/356; 370/390; 455/512; 455/519; 455/524; 455/416

(58) Field of Classification Search ................. 455/518, 455/500, 507, 517, 519, 524, 161.3, 135, 455/416–417, 463, 452.2, 512; 370/259, 370/260–261, 332, 333, 395.42, 328, 353–356, 370/389–390, 395.1, 444, 484

See application file for complete search history.

(56) References Cited

U.S. PATENT DOCUMENTS

| 5,387,905 | A | * | 2/1995 | Grube et al. ........... 340/825.52 |
| 5,634,197 | A | * | 5/1997 | Paavonen .................... 455/512 |
| 6,317,595 | B1 | * | 11/2001 | St. John et al. .............. 455/417 |
| 6,725,052 | B1 | * | 4/2004 | Raith ......................... 455/518 |
| 6,836,666 | B2 | * | 12/2004 | Gopalakrishnan et al. ....................... 455/452.2 |
| 7,085,579 | B2 | * | 8/2006 | Mizutani et al. ............ 455/512 |

FOREIGN PATENT DOCUMENTS

| WO | WO-9307723 | 4/1993 |
| WO | WO-01/13671 | 2/2001 |
| WO | WO-0167787 | 9/2001 |

OTHER PUBLICATIONS

Search Report, "International Search Report", PCT/NZ03/00142, (Oct. 20, 2003), pp. 3.

* cited by examiner

*Primary Examiner*—Matthew D Anderson
*Assistant Examiner*—Shaima Q Aminzay
(74) *Attorney, Agent, or Firm*—Blakely Sokoloff Taylor & Zafman LLP (57) ABSTRACT

A method of arbitrating group calls in a digital mobile radio system without need of a central component. In general terms the base station that are serving mobile units in a call each announce the nature of the signals that they are receiving. The stations then each compare the signals and decide which signal will be broadcast to the mobile units. The signals are preferably transmitted between base stations via a packet network using IP multicast.

13 Claims, 15 Drawing Sheets

FIGURE 15

GROUP CALLS IN A MOBILE RADIO SYSTEM

CROSS-REFERENCES TO RELATED APPLICATIONS

The present patent application is a national phase application of International Application No. PCT/NZ2003/000142 filed Jul. 4, 2003, which claims priority from New Zealand Application No. 519996 filed Jul. 4, 2002.

FIELD OF THE INVENTION

This invention relates to calling patterns in mobile radio systems, particularly but not only to wide area group calls in packet switched data networks.

BACKGROUND TO THE INVENTION

A common calling pattern in mobile radio systems is a wide area group call in which multiple mobile users served by multiple sites can all converse. These calls may be implemented in trunked, simulcast and voted conventional networks. Base stations provide an air interface for the users. When a user speaks they are heard by all other group members on all sites participating in the group.

Sometimes two users at different sites speak at the same time. In analogue conventional and simulcast networks a centralised voter is commonly used to arbitrate or choose one signal to be broadcast by the base stations. Trunked networks often use a centralised conference bridge to mix the audio received from all of the participating sites. Circuit switched telephony also generally uses a centralised conference bridge. Packet voice systems typically use a range of approaches for conference calls including a centralised multi point controller.

Conventional systems have various drawbacks. There is a reduced choice of speech paths and calls must be sent through a voter, bridge, controller or other centralised component, even if the base stations serving the users are close together. This component can be a common point of failure. These systems are not fully scalable and the central component usually accommodates only a fixed number of base stations. It may be unnecessarily expensive in both small and large networks, and is simply another component in the overall structure of a network.

SUMMARY OF THE INVENTION

It is an object of the invention to provide an improved method of arbitrating group calls in a digital mobile radio system, or at least to provide an alternative to existing methods. In general terms the base stations that are serving mobile units in a call each announce the nature of the signals that they are receiving. The stations then each compare the signals and decide which signal will be broadcast to the mobile units, without need of a central component. The signals are preferably transmitted between base stations via a packet network using IP multicast. In one aspect the invention may be said to consist in a method of operating a packet network having base stations for communication with mobile units, comprising: initiating a call involving a group of mobile units, receiving a signal at two or more of the base stations from one of the units, determining a respective priority parameter for the signal received at each base station, adding the priority parameters to at least some packets of the respective signals, transmitting the signals containing the priority parameters to the network, receiving the signals at base stations for transmission to mobile units in the group, and transmitting the signal having a selected priority parameter to the mobile units Preferably the method includes ceasing transmission to the network, of a signal received from the mobile unit, after determining that the signal has a priority lower than that of a corresponding signal received from the network. The method may also include commencing transmission of a signal to the network, received from the mobile unit, after determining that the signal has a priority greater than that of a corresponding signal received from the network.

Preferably the priority parameter is determined by quality of the respective signal received from the mobile, and the signal transmitted to the units is selected according to highest quality. Alternatively the priority parameter may be determined by a priority allocated to the calling unit. The priority parameter of a signal is generally set to a termination value when the signal ends. The priority parameter may or may not be sent in a voice packet, and could be sent in a special voting or quality packet, or included in a packet that contains other signalling data.

In a further aspect the invention consists in a method of operating a packet network having base stations for communication with mobile units, comprising: initiating a call involving a group of mobile units, receiving signals at two or more of the base stations from two or more of the units, determining a respective priority parameter for each of the signals received at a base station, adding the priority parameters to at least some packets of the respective signals, transmitting the signals containing the priority parameters to the network, receiving the signals at base stations for transmission to mobile units in the group, and transmitting the signal having a selected priority parameter to the units.

Preferably the method further comprises ceasing transmission to the network, of each signal received from a mobile unit, that has a priority lower than that of a corresponding signal received from the network.

In a further aspect the invention consists in a communication network or a base station for a network that implements or assists in a method as set out above.

LIST OF FIGURES

Preferred embodiments of the invention will be described with respect to the drawings, of which.

DESCRIPTION OF PREFERRED EMBODIMENTS

Referring to the drawings it will be appreciated that group calls according to the invention may be implemented in many ways in a range of networks. Details of the mobile units, base stations and networks will be understood by a skilled reader and have not been included.

Figure 1:
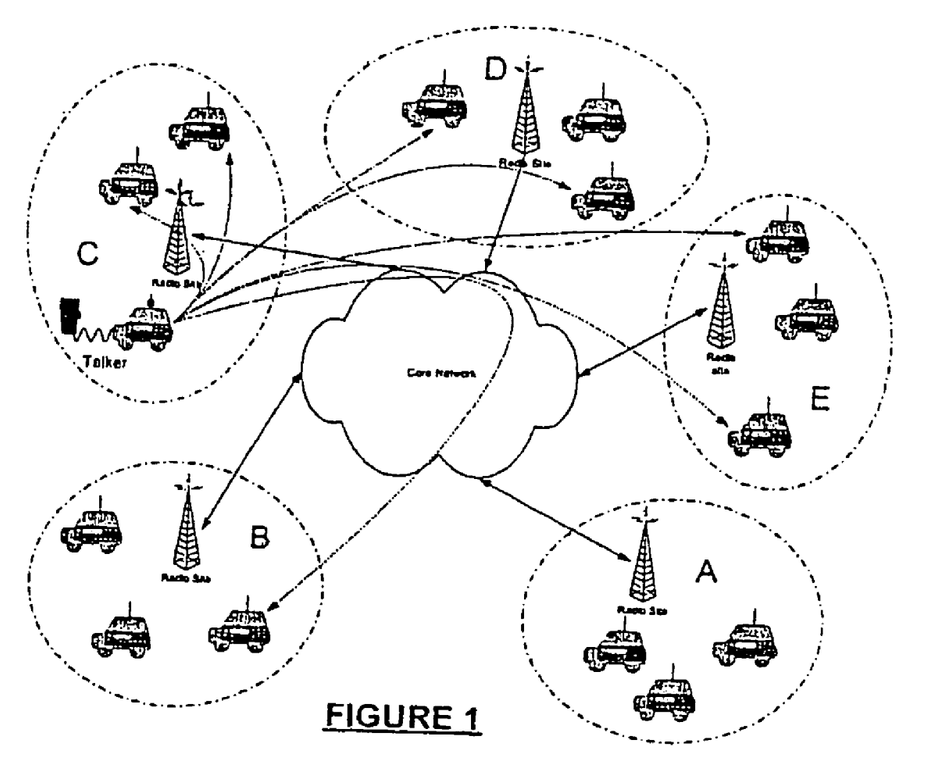
FIG. 1 shows a mobile radio system having a core network, base stations and mobile units.

FIG. 1 schematically shows a mobile radio system having a core network and five base stations A-E serving mobile units. The core network is a packet network using the Internet Protocol, for example, that may be connected in various ways. Each base station generally has an irregular area of RF service that may overlap with the service areas of other stations. The units may be within range of several base stations at once but are generally captured by one or other station according to the quality or other aspects of their respective signals. The units may participate in group calls using IP multicast techniques within the core network. Packets from a talker unit are distributed between base stations in the network and broadcast to other units in the group.

Signals received at base stations involved in a group call are of varying quality depending on how close the transmitting mobile or mobiles are to the stations. The signals may be given priority in accord with their quality, or with another parameter such as status of the mobile user, in order to determine how they will be broadcast to the group. Quality is usually measured in terms of received or residual bit error rate. Base stations transmitting voice packets to a multicast address in the core network attach a quality metric or similar parameter to at least some of the packets that they send. Stations receiving RF signals from mobile units compare the quality metrics in signals from the network with those in signals from the RF links. The comparison by each station is used to determine whether to start, continue or cease sending to the multicast.

Figure 2:
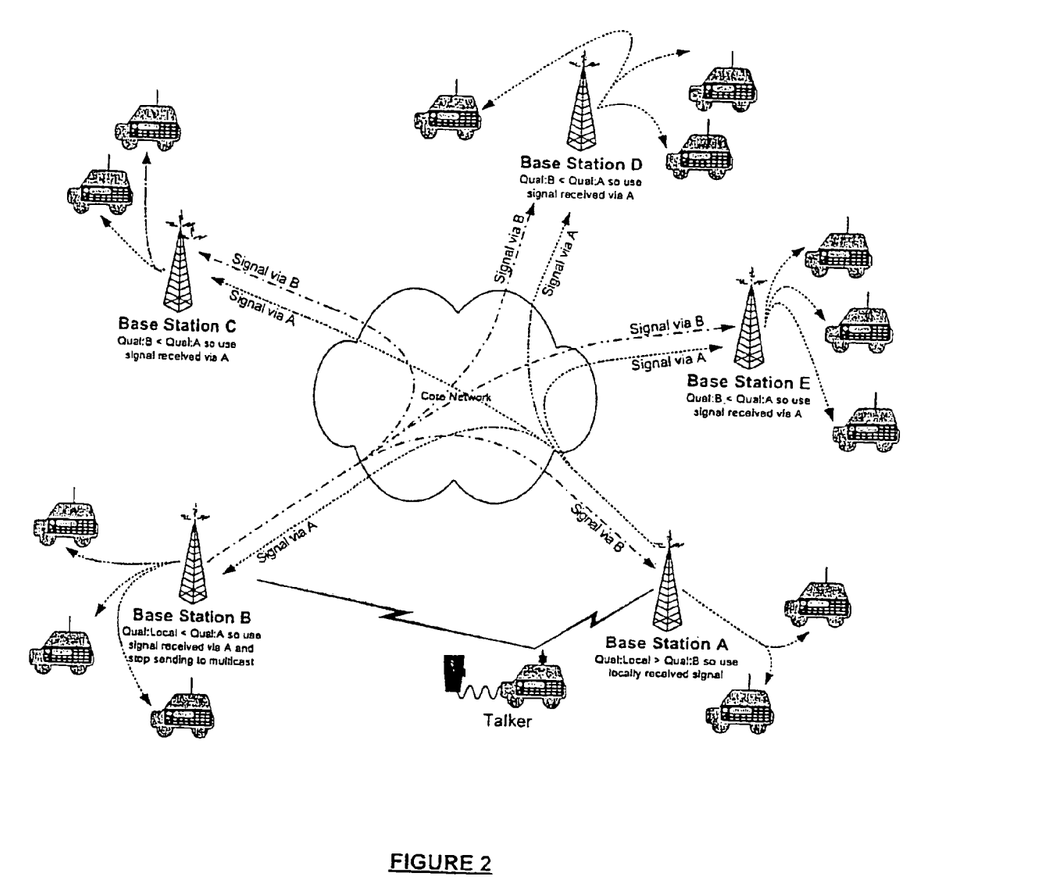
FIGS. 2-7 are a sequence showing the user of a mobile unit in FIG. 1 talking in a group call.

FIG. 2 shows the user of a mobile unit within range of two base stations A and B, starting to talk to a group of units. The RF signal at station A has higher quality than the signal at station B. Initially both stations send their received signal to the multicast address in the core network and both include respective quality metrics in at least some of the packets they send. Stations C, D, E receive both signals and determine that the quality of A is greater than that of B, and therefore that the signal received from A should be transmitted on the RF link to other units in the group. Station B also receives the signal from station A and transmits that signal locally to other mobiles, rather than the signal it has received itself from the talker unit. Station A receives the signal from station B and transmits the signal received directly from the talker unit, rather than the signal from station A.

Figure 3:
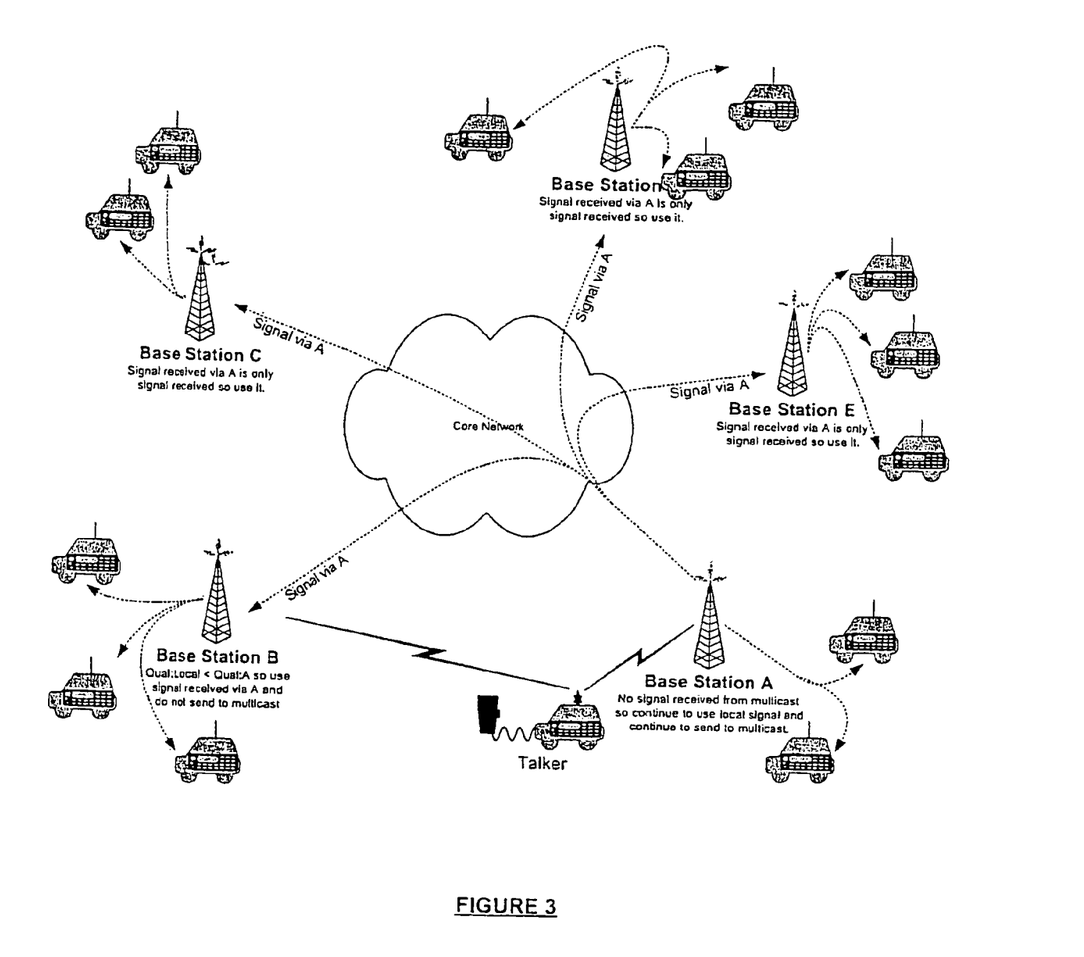

In FIG. 3, base station B determines that the signal received from station A has higher quality than the signal received locally from the talker unit, and ceases to send the local signal to the network. Stations C, D, E receive and broadcast only the signal from station A. The signal from station A may or may not continue to include a quality metric or other priority parameter.

Figure 4:
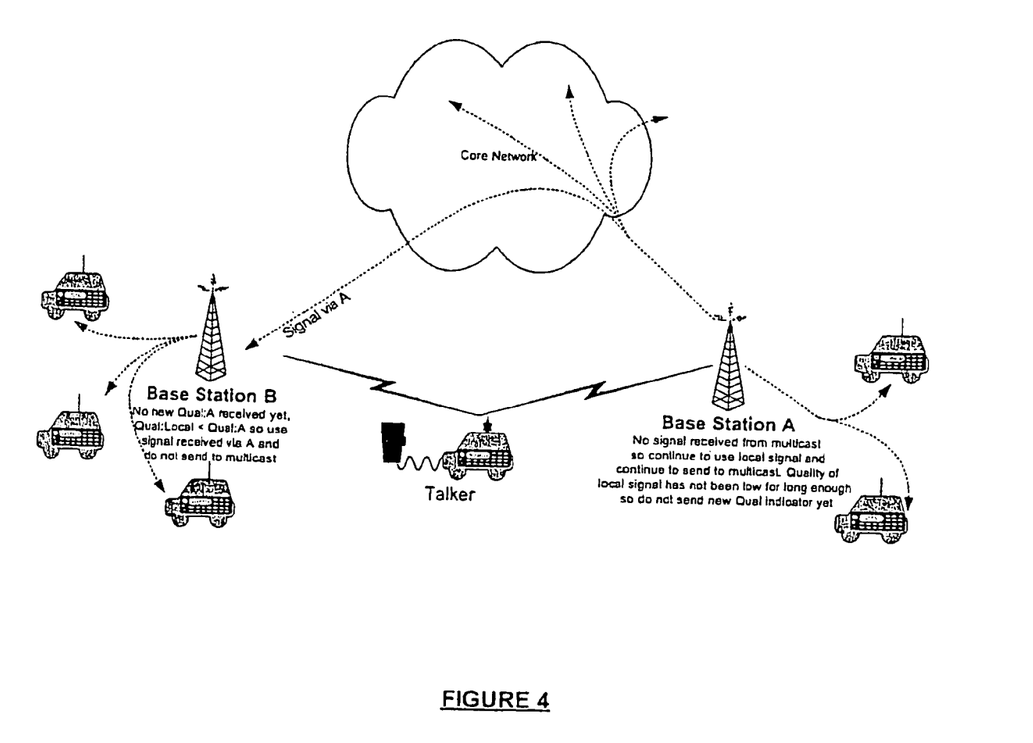

In FIG. 4 the talker unit has moved closer to station B so that the signal received at station B has higher quality than that of station A. However, station A has not yet transmitted a new quality indicator so transmission to the network by station A continues, and station B remains silent in relation to this particular call. Stations B, C, D, E continue to broadcast the signal from station A.

Figure 5:
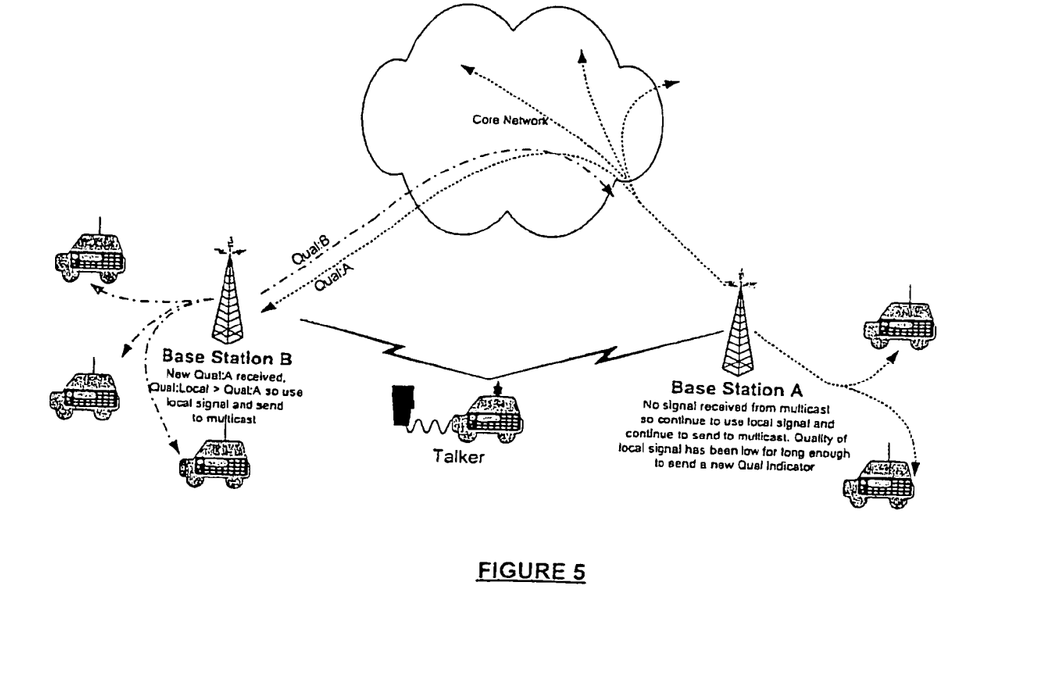

In FIG. 5 station A now sends a quality indicator in the signal to the network. An indicator might be sent at regular intervals or according to actual quality of the signal for example. Station B compares the quality indicator to the quality of the signal that is received locally from the talker unit. Station B determines that the local quality is higher than that of the signal from station A and starts sending the locally received signal to the network.

Figure 6:
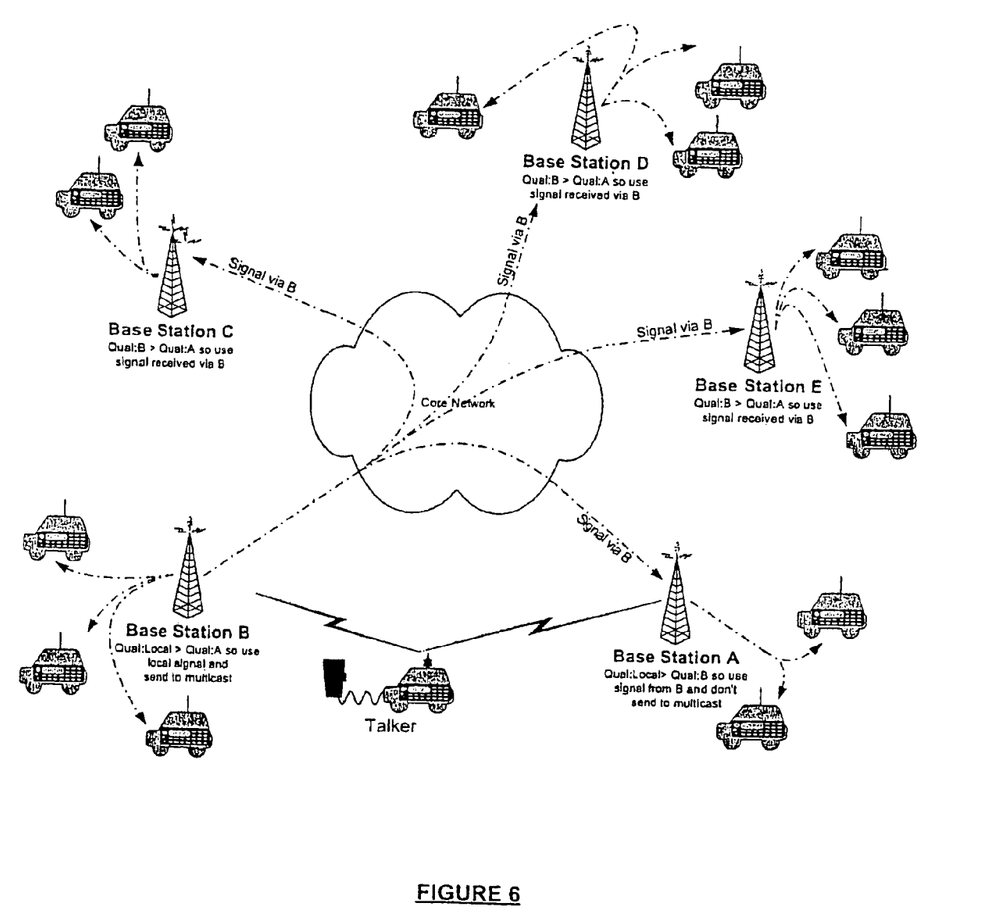

In FIG. 6 all base stations have received the multicast signal from stations A and B. Each determines that the signal from B has higher quality than the signal from station A and broadcast the signal from station B to units in the group call. Station A ceases transmission of its locally received signal, and transmits the signal from B to the local units involved in the call.

Figure 7:
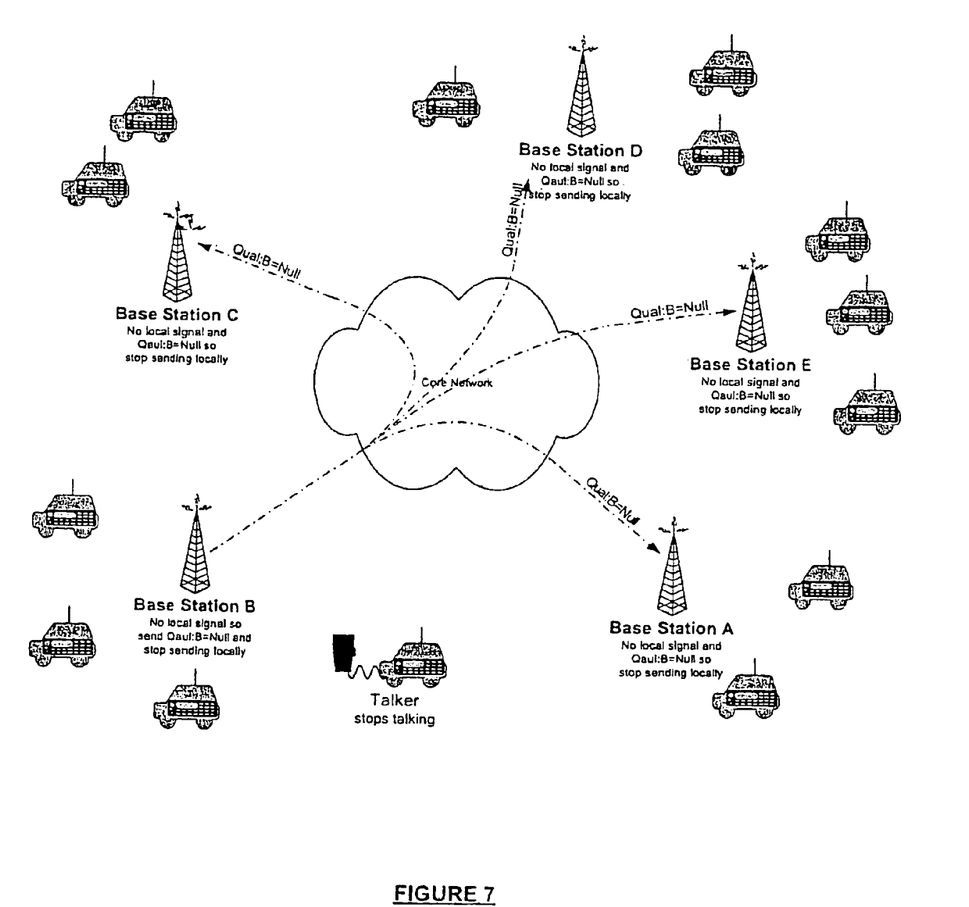

In FIG. 7 the user of the talker unit stops speaking and station B indicates this to the rest of the network. For example, a signal having the lowest possible quality or a null parameter is sent as the signal is terminated.

Figure 8:
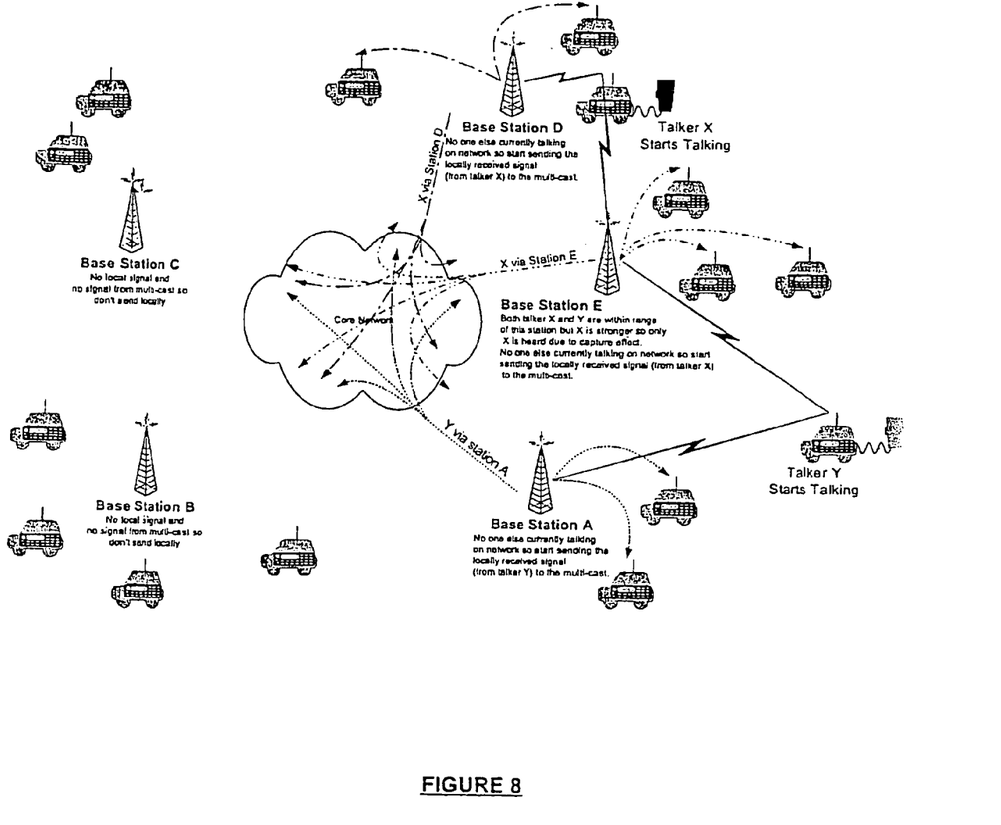
FIGS. 8-10 are a sequence showing users of two mobile units attempting to talk in a group call.

FIG. 8 shows the users of two mobile units in a group call starting to talk at the same time. Talker unit X is within range of base stations D and E. Talker unit Y is within range of base stations E and A. At station E, unit X has a stronger or better quality signal than unit Y and unit X takes precedence by a capture effect. Stations D, E and A all send their signals locally received from units X or Y to the network. Each adds a quality metric to the signal.

Figure 9:
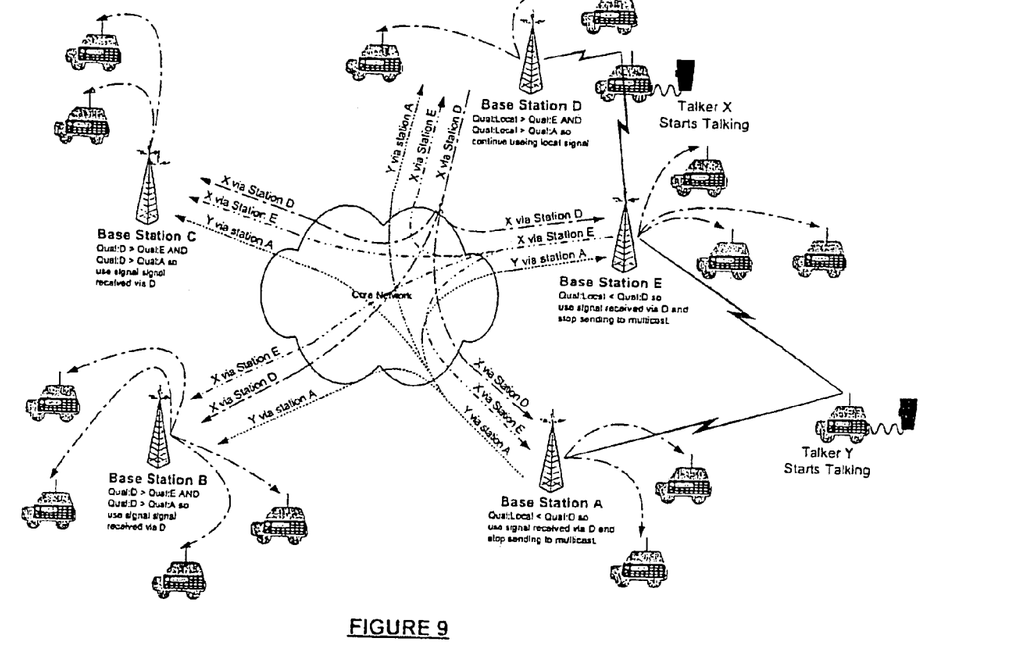

In FIG. 9 all base stations are receiving the signals from stations D, E, A through the network, including a quality metric. However, the signal from station D for unit X has the highest quality and only that signal is broadcast to the other units in the call. A session continuity mechanism ensures that the signal from unit X continues uninterrupted by signals from other units at which a user attempts to talk and that may have higher quality than that from unit X.

Figure 10:
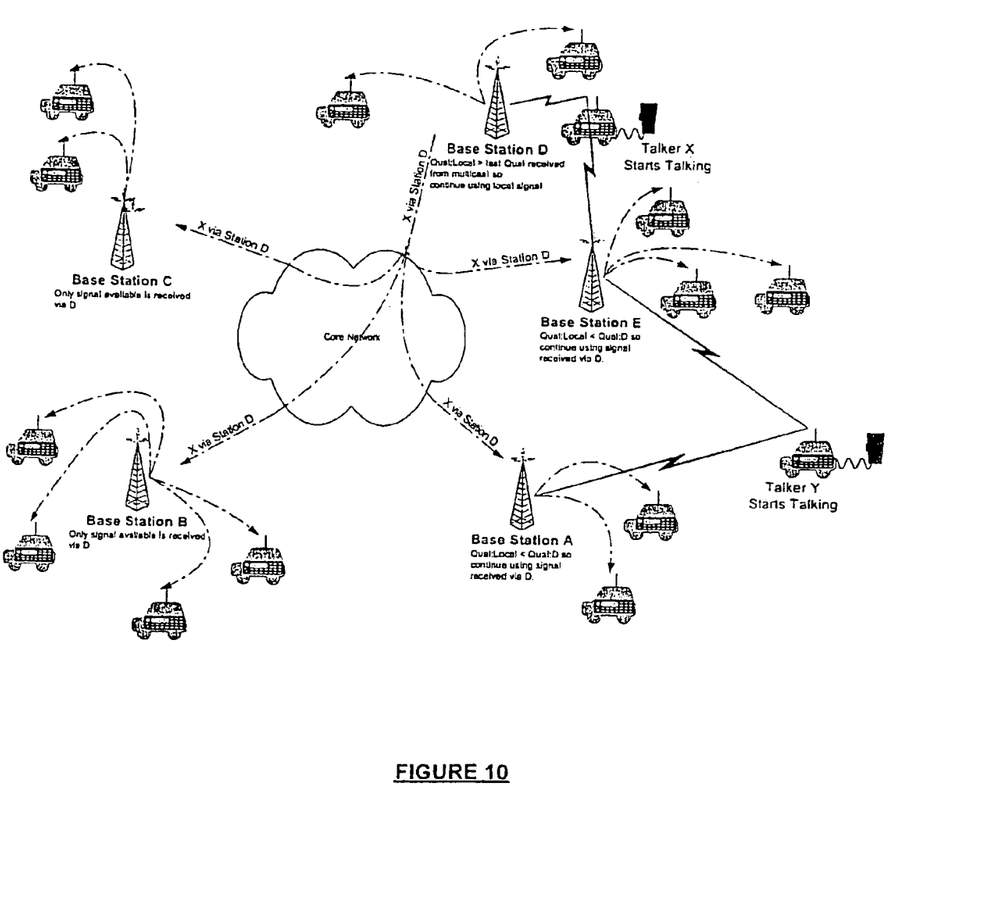
Figure 11:
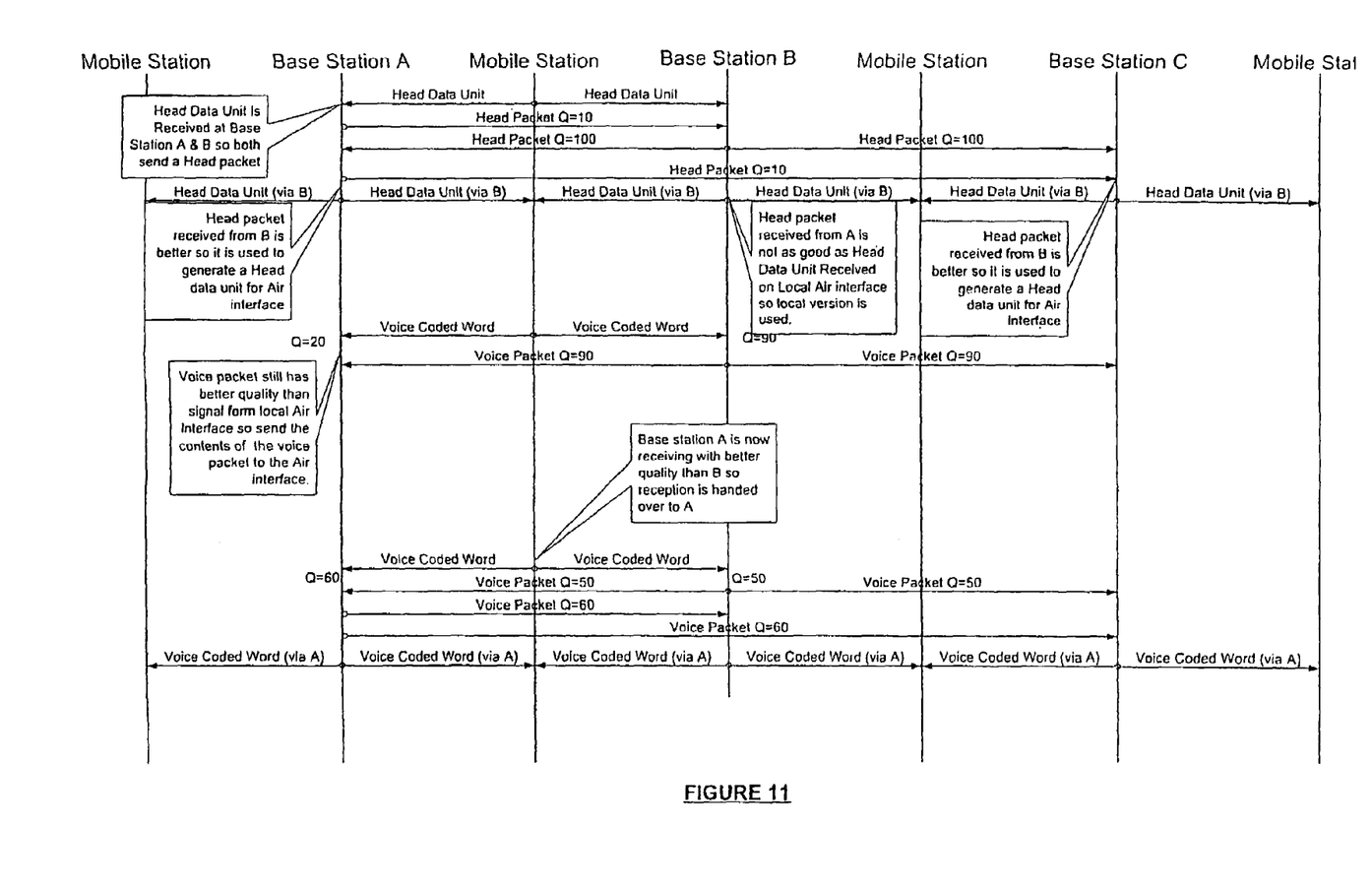
FIG. 11 shows detail of typical messages transmitted between the mobile units and the base stations in relation to FIGS. 2-10, FIGS. 12-15 summarise the states and transitions between states of a base station in FIGS. 2-11.

In FIG. 10 stations E and A have received the quality indicator in the signal from station D and cease transmission of their locally received signals. All stations now broadcast the signal received from unit X by station D.

Sending a Quality Metric

Traffic channels that are receiving data over the air interface may transmit packets to the multicast address assigned to the group call. They will generally send packets to the multicast with a quality metric in the following situations:

They receive a packet from the network with a quality indicator that is worse than the quality of data they are currently receiving on the air interface.

There is a pause in the conversation, they are not receiving any packets from the network but they start receiving data on the air interface.

They are currently sending packets to the network but the quality of the data received on the air interface degrades significantly. This will prompt a base station with a better signal to start sending to the multicast.

They are currently sending packets to the network but they stop receiving data on the air interface. This may indicate a pause in the conversation.

They are currently sending packets to the network but they have not sent a quality indicator for some time out, 5 seconds for example. It may be desirable to send a quality metric with every voice packet.

The traffic channel currently sending packets to the network controls re-voting by sending the quality metric or a vote flag.

The quality metric may or may not be carried on a packet that includes voice data. The packet may be a special voting or quality packet or a packet that carries other signalling data.

Receiving a Quality Indicator

When traffic channels receive packets from multiple sources they will use the most recently received quality metric from each source to decide which one to transmit on the air interface. Only the packets from the source with the best quality indicator will be sent.

Traffic channels which are sending data to the multicast will stop transmitting if they receive a packet with a better quality indicator than they are currently receiving on the air interface.

Over Procedures

At the start of each over (a talk burst during conversation) all the traffic channels that are receiving data on the air interface will send packets to the multicast address. Only the traffic channel with the best quality signal received on it's air interface will continue sending to the multicast. The others will stop transmitting as they receive packets with better quality indicators. The traffic channel sending to the multicast will periodically send a quality indicator. This is an opportunity for other traffic channels to become the talker if they have a better signal.

At the end of each over (when the current talker stops talking and releases PTT) the base station currently sending to the multicast will send an end of over indication. This indication may simply be a quality metric indicating the lowest possible quality.

Figure 12:
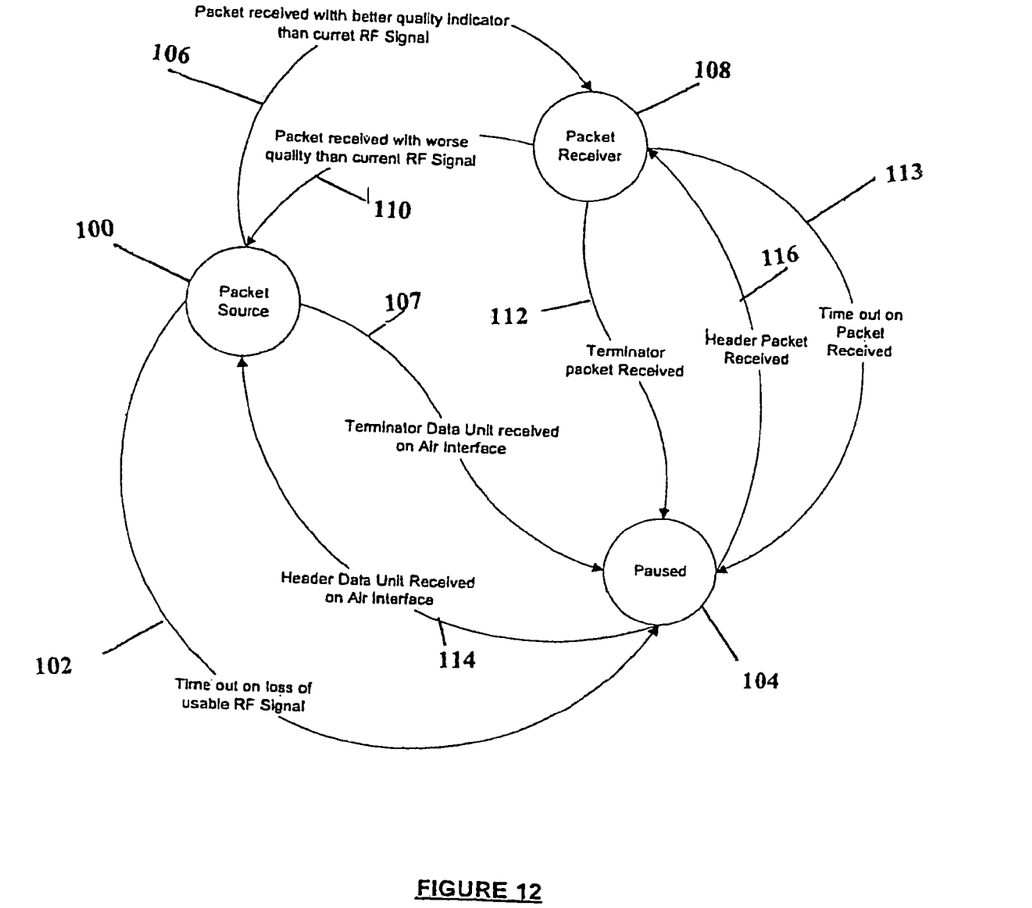

Accordingly, a base station may be a packet source, or a packet receiver and alternate between the two. Referring to FIG. 12 a base station acting as a packet source 100 may time out 102 on the loss of useable RF signal from a mobile unit. The base station will go into pause mode 104 in this event.

The base station when acting as a packet source 100 may also receive at 106 a packet from the packet network having a priority parameter greater than the priority parameter associated with the signal being broadcast to the packet network by the base station. In this event, the base station will no longer broadcast its current RF signal and will thus become a packet receiver 108.

Also, when acting as a packet source 100 a base station 100 may receive at 107 a Termination Data Unit from the mobile unit from which the signal is received. In this instance the base station 100 will resort to pause mode 104, until it becomes a packet source or packet receiver again in the future.

When acting as a packet receiver 108 the base station may receive, at 110, a packet from the packet network having a lower priority parameter, than the priority parameter received from a mobile unit by the base station 108. In this instance the base station will become a packet source 100.

Also, when acting a packet receiver the base station 108 may receive 112 a terminator packet from the network. This is a indication that the mobile unit from which a signal is being broadcasted has finished talking. In this instance the base station 108 will enter pause mode 104, until it becomes a packet source or packet receiver again in the future.

A packet receiver 108 may also time out on a packet received from the network. In this instance the base station 108 will also resort to paused mode 104.

When a base station is in paused mode 104 a number of events may occur that cause the base station to revert to being a packet source 106 or a packet receiver 108. For example, if the base station receives a Header Data Unit 114 from one of the mobile units, it would resort to being a packet source 100. Alternatively, if the base station receives a Header packet from the network 113 (indicating the presence of a signal from a mobile unit not in the range of the base station) the base station would resort to being a packet receiver 108.

Further detail of the operation of base stations in various states is given by reference to FIGS. 13-16.

Figure 13:
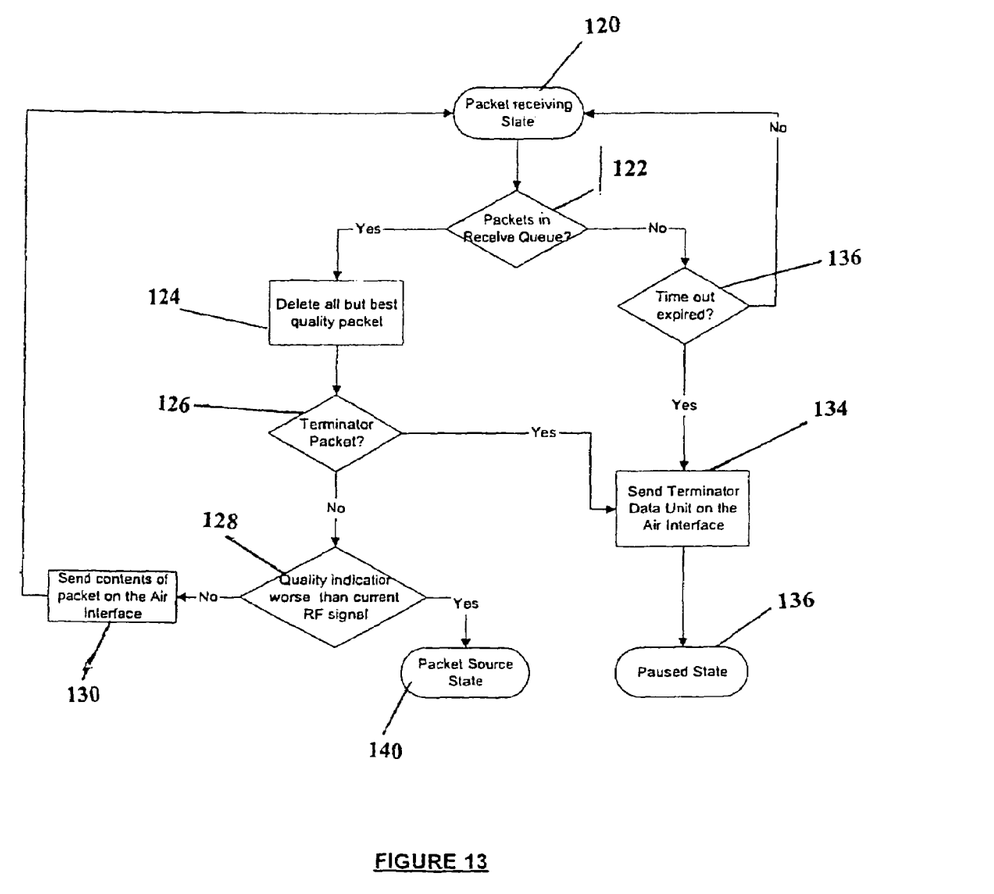

Turning first to FIG. 13 a base station in a packet receiving state checks at 122 whether there are any packets from the network in its receive queue. In the event that there are packets in the queue the base station, at 124, deletes all but the best quality packet from the queue. A test is performed at 126 to determine whether the remaining packet is a terminator packet. If the packet is not a terminator packet a further test is performed at 128 to determine whether the priority parameter from the packet is lower than a priority parameter associated with a signal from a mobile unit in range of the base station. If the priority parameter from the packet is not lower, the packet is sent by the base station, at 130 to each mobile unit in its range. Alternatively, if priority parameter from the packet is lower, which indicates that a signal from a mobile unit in rage of the base station is of better quality than a packet received from the network, the base station will revert, at 132 to the packet source state.

Returning to 126, if the remaining packet is a terminator packet, a terminator data unit is sent, at 134, to the mobile units, and the base station reverts to a paused state 136.

Returning to 122, if there are no packets in the queue, a test is performed at 136, of whether a predetermined time between receiving packets from the network has elapsed. If the time has elapsed, a terminator data unit is sent to the mobile units in range of the base station. Alternatively, if the timeout value has not been reached, the base station, at 120 waits again for packets from the network.

Figure 14:
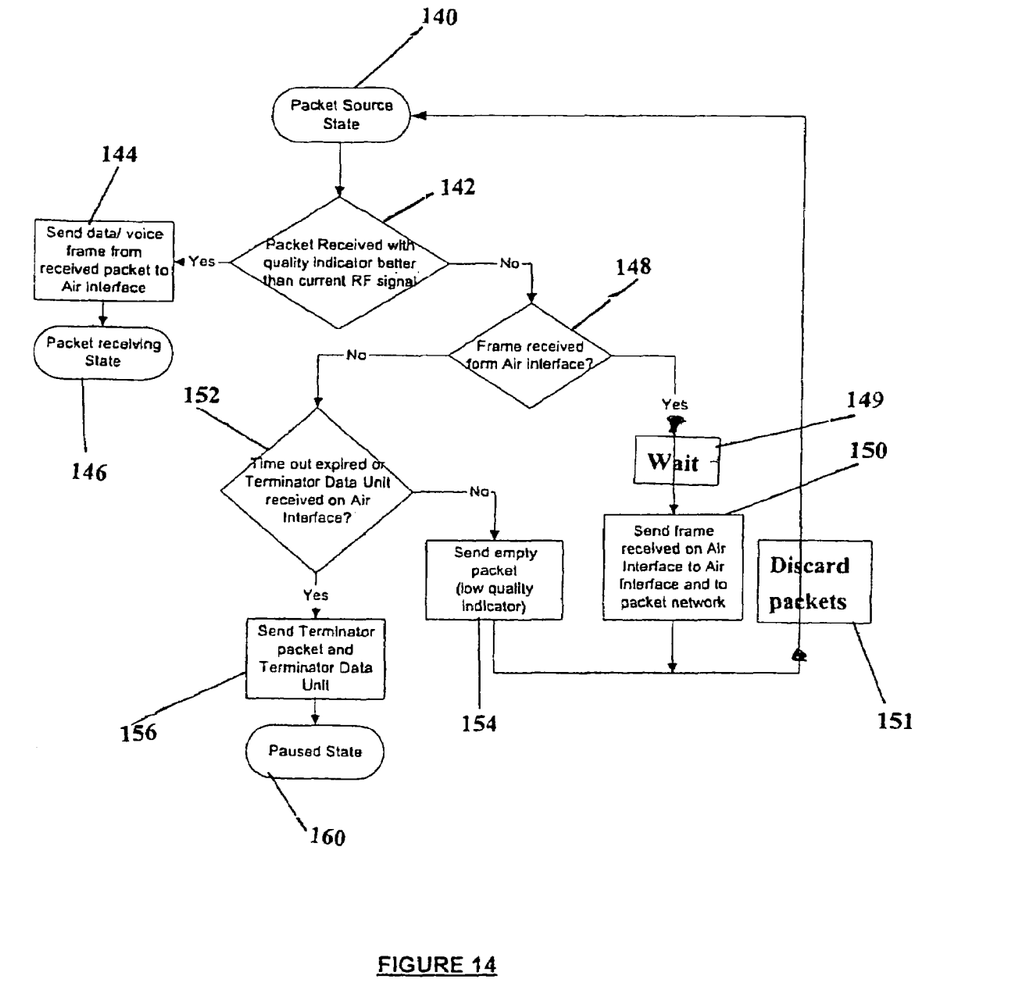

Turning to FIG. 14, a base station in packet source state 140, performs a test at 142 of whether a packet received from the network has a priority parameter greater than the priority parameter from the mobile unit from which the signal is currently being broadcast. If the priority parameter is greater, at 144, a voice/data frame from that packet is sent to the mobile units in range of the base station and the base station reverts to a packet receiving state 146.

If the priority parameter from the packet is lower, a test is performed, at 148 to determine whether a frame has been received from a mobile unit in range of the base station. Where a frame has been received, the base station may wait 149 for a predetermined time delay if the base station has only recently entered packet source state. This time delay is calculated to give the base station previously in packet source state, time to stop sending packets to the network and stop competing for bandwidth. After the time delay has elapsed the packet is sent at 150 to the other mobile units in range of the base station, and to the packet network for forwarding to the other base stations. If the base station has only recently entered packet source state it may discard some packets at 151. Generally, these are chosen from the first 10 or 20 packets sent to the base station. This allows packet buffers in the network to empty after the traffic burst caused by the transition of a base station from packeting receiving state to a packet source state. Further, packet loss mitigation at receivers allows for discarded packets to be recovered. The base station then re-enters packet source state 140.

Where the base station has not received a frame from a mobile unit, a further test is performed at 150, to determine whether a predetermined time has elapsed since receipt of the last frame, or whether a terminator frame has been received from a mobile unit. Where neither of those conditions are satisfied an empty packet (having a low priority parameter) is sent by the base station at 154, with the base station then reverting to the packet source state 140 to repeat the process.

If either of the conditions are satisfied, at 156, a terminator packet is sent on the network and a terminator data unit is sent to the mobile units in range of the base station. The base station then reverts to the paused state 160.

Figure 15:
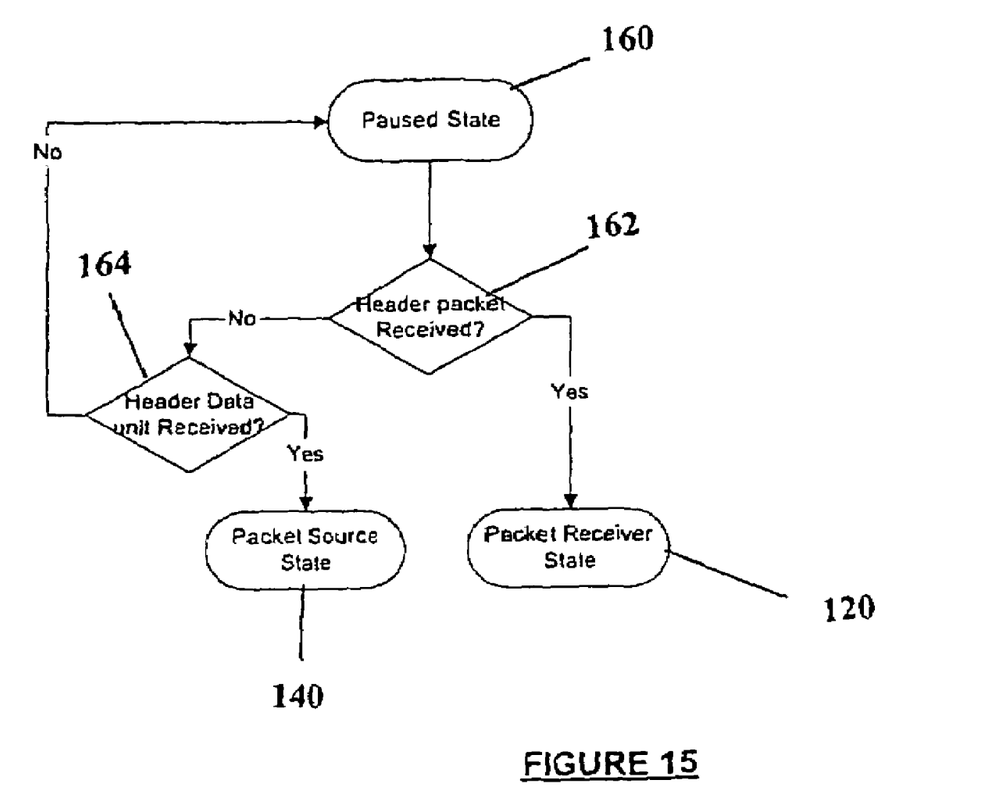

Turning to FIG. 15, a base station in the paused state 160, performs a test at 162 to determine whether a header packet has been received from the network. If a packet header is received the base station reverts to packet receiver state 120. Alternatively, a further test is performed at 164 of whether a header data unit has been received from a mobile unit. If the header data unit is received, the base station reverts to the packet source state 140. Alternatively, the base station remains in the pause state 160.

The invention claimed is:

1. A method of operating a packet network having base stations for communication with mobile units, comprising:
   initiating a call involving a group of mobile units,
   receiving a wireless signal at two or more of the base stations, from one of the mobile units,
   determining at each of the base stations, a respective quality parameter for the wireless signal as received at the base station,
   adding the quality parameters to at least some packets of the respective signals to form prioritized signals,
   transmitting the prioritized signals containing the respective quality parameters to the network,
   receiving the prioritized signals at base stations in the network,
   selecting at each of the base stations, a prioritized signal for transmission to mobile units in the group, according to the respective quality parameters, and transmitting the selected signal to the mobile units.

2. A method according to claim 1 further comprising ceasing transmission to the network, of a signal received from the mobile unit, after determining that the signal has a priority lower than that of a corresponding prioritized signal received from the network.

3. A method according to claim 1 further comprising commencing transmission of a signal to the network, received from the mobile unit, after determining that the signal has a priority greater than that of a corresponding prioritized signal received from the network.

4. A method according to claim 3 further comprising the step of waiting for a predetermined time before commencing transmission of the signal to the network.

5. A method according to claim 3 further comprising the step of discarding at least one packet of the signal transmitted to the network.

6. A method according to claim 1 wherein the quality parameter is determined by reference to a quality of the respective wireless signal received from the mobile unit, and the signal transmitted to the units is selected according to highest quality.

7. A method according to claim 6 wherein the quality is an error count for part or all of the respective wireless signal received from the mobile unit.

8. A method according to claim 6 wherein the quality is the received signal strength of the respective wireless signal received from the mobile unit.

9. A method according to claim 6 wherein the quality is the signal to noise ratio of the respective signal received from the mobile unit.

10. A method according to claim 6 wherein the quality parameter of a signal is set to a termination value when the signal ends.

11. A method of operating a base station in a packet network during a group call between mobile units, the method comprising:
    receiving a wireless signal from a mobile unit in the group call;
    determining a quality parameter for the received signal;
    adding the parameter to at least some packets of the received signal to form a prioritized signal;
    transmitting the prioritized signal to the network;
    receiving from the network, one or more prioritized signals originated from the mobile unit and having respective quality parameters; and
    ceasing transmission to the network if the added quality parameter is lower in priority than any of the received quality parameters.

12. A method of operating a base station in a packet network during a group call between mobile units, the method comprising:
    receiving prioritized signals containing respective quality parameters from two or more other base stations in the network, each of the prioritized signals having been received by the other base stations as a wireless signal from a common mobile unit;
    selecting one of the received signals according to the received quality parameters, and
    transmitting the selected signal to units in the group call.

13. A method of operating a base station according to claim 12 further comprising selecting a different one of the received signals according to changes in the respective quality parameters.

* * * * *